United States Patent
Chang et al.

(10) Patent No.: US 10,349,626 B2
(45) Date of Patent: Jul. 16, 2019

(54) INVERSE ANIMAL FEEDER

(71) Applicant: CIXI HAOSHENG ELECTRONICS & HARDWARE CO., LTD., Cixi, Zhejiang (CN)

(72) Inventors: Shih-Ming Chang, Cixi (CN); Jin-Jun Cao, Ningbo (CN)

(73) Assignee: CIXI HAOSHENG ELECTRONICS & HARDWARE CO., LTD., Cixi, Zhejiang (CN)

( * ) Notice: Subject to any disclaimer, the term of this patent is extended or adjusted under 35 U.S.C. 154(b) by 192 days.

(21) Appl. No.: 15/450,029

(22) Filed: Mar. 6, 2017

(65) Prior Publication Data
US 2018/0249678 A1    Sep. 6, 2018

(51) Int. Cl.
*A01K 5/02*     (2006.01)

(52) U.S. Cl.
CPC ................... *A01K 5/0291* (2013.01)

(58) Field of Classification Search
CPC .......... A01K 5/0225; A01K 5/02; A01K 5/00; A01K 39/014
See application file for complete search history.

(56) References Cited

U.S. PATENT DOCUMENTS

| | | | |
|---|---|---|---|
| 8,191,804 B1 * | 6/2012 | Pullara, Jr. ............. | A01C 15/02 222/317 |
| 8,607,736 B1 * | 12/2013 | Plant ..................... | A01K 5/0225 119/57.91 |
| 8,631,764 B2 * | 1/2014 | Quiring ................ | A01K 5/0225 119/57.91 |
| 9,380,740 B2 * | 7/2016 | Myers ................... | A01C 17/001 |
| 9,468,947 B2 * | 10/2016 | Issa ....................... | A01K 39/012 |
| 2012/0085289 A1 * | 4/2012 | Quiring ................ | A01K 5/0225 119/57.91 |
| 2014/0116343 A1 * | 5/2014 | Collins ................. | A01K 5/0225 119/51.11 |
| 2015/0336118 A1 * | 11/2015 | Myers .................... | E01C 19/023 239/684 |
| 2018/0064063 A1 * | 3/2018 | Jahns .................... | A01K 5/0225 |
| 2018/0125030 A1 * | 5/2018 | Glover ................. | A01K 5/0225 |

* cited by examiner

*Primary Examiner* — Kristen C Hayes
(74) *Attorney, Agent, or Firm* — Leong C. Lei

(57) ABSTRACT

An inverse animal feeder comprises a feeding device, a power controlling device and a tray. The feeding device comprises a cover plate and a feeding opening inside the cover plate. The power controlling device comprises a motor in a main frame, a power source and a controller for feeding automatically. The tray mounted below the power controlling device and in an outer frame, and the tray is driven by the motor. The outer frame has a plurality of through holes; the main frame is mounted between the cover plate and the outer frame; and the cover plate is connected to the main frame by holders. Additionally, the main frame has at least one fastening block and the outer frame has at least one fastening groove, so that the fastening groove is fastened to the fastening groove to connect the main frame and the outer frame.

3 Claims, 5 Drawing Sheets

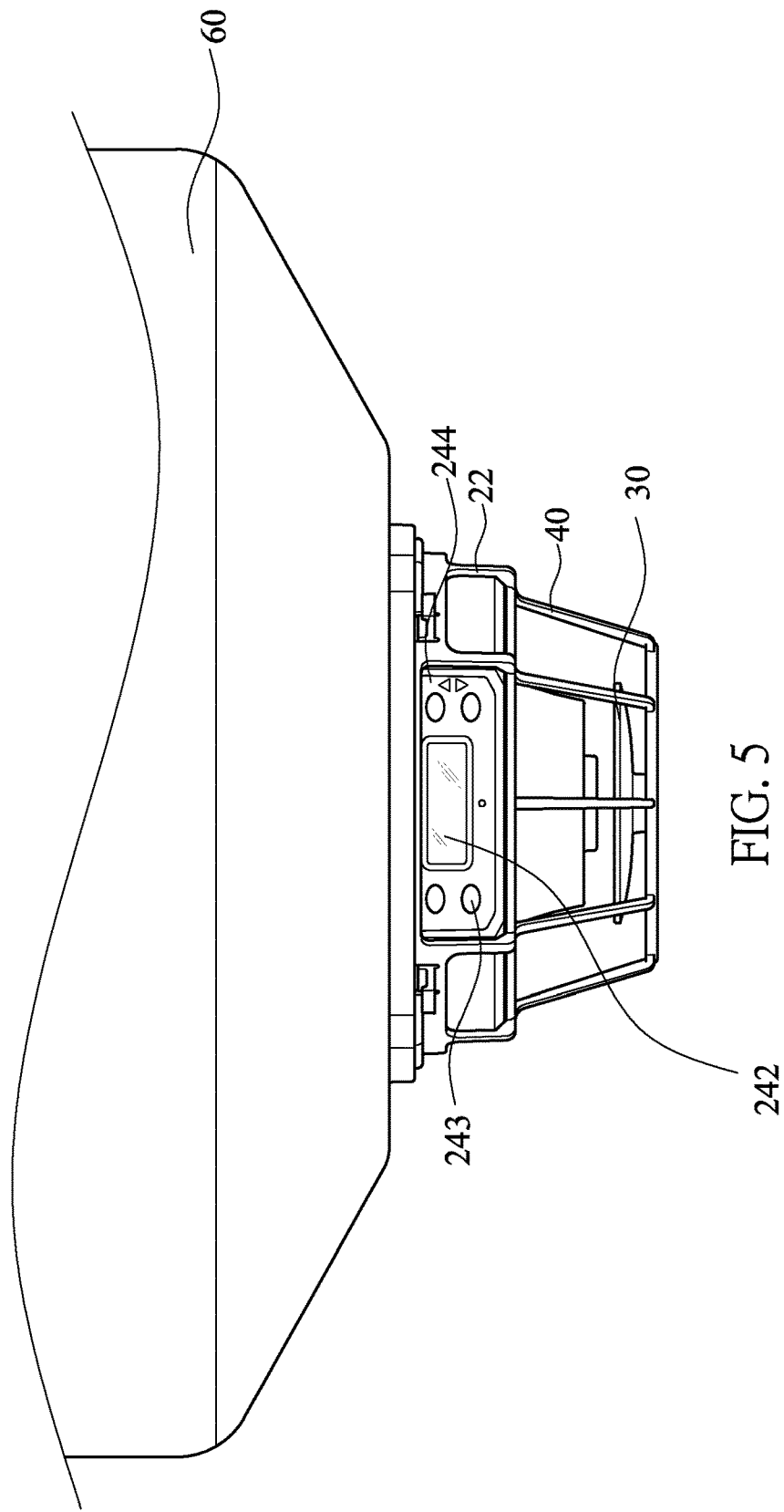

INVERSE ANIMAL FEEDER

(a) TECHNICAL FIELD OF THE INVENTION

The present invention relates to an animal feeder for spraying feeds, and more particularly to an inverse animal feeder capable of feeding regularly to animal at the set time by a user.

(b) DESCRIPTION OF THE PRIOR ART

The domestic animals are farmed in a wide area; therefore, the primary problem is to dispense feeds effectively so as to keep the animals healthy and well-nourished. Conventionally, feeds are placed in an elongated feeder where the animals can take the feeds by themselves.

A conventional feed dispensing device is provided to solve the described problem, where feeds are kept in a high place and then sprayed out by centrifugal force to make sure that every animal can have enough food.

The conventional feed dispensing device has a hollow container with doors disposed on its circumferential wall. When the container is rotated up to a certain speed, the feeds inside the container push open the doors and are thus sprayed around. However, the drawback is that the doors cannot be pushed open when the amount of feeds in the container is not enough. There is another rotational feed dispensing device where a door-less container is rotated by a driving device to spray the feeds also by centrifugal force.

The conventional feed dispensing device has a tray and a motor, and the tray is mounted over the motor; therefore, there is a big box structure in which the motor and accumulator batteries are mounted below the tray. Besides, the big box structure is connected to a bottom of a feeding barrel by holders, which results in instability of overall structure.

SUMMARY OF THE INVENTION

The present invention provides an inverse animal feeder to solve the problems in the prior art and is described above. An object of the present invention is to provide an inverse animal feeder, in which a motor and a tray are mounted and the motor is mounted over the tray. Therefore, it can be prevented the inverse animal fee from vibrating when the motor driven the tray, and the stability of the inverse animal feeder is enhanced.

To achieve the above object, the present invention provides an inverse animal feeder. The inverse animal feeder comprises a feeding device, a power controlling device and a tray. The feeding device includes a cover plate and a feeding opening through the cover plate. Further, the power controlling device comprises a motor in a main frame, a power source and a controller for feeding automatically. Furthermore, the tray has a plurality of baffles and is mounted below the power controlling device. The tray is mounted in an outer frame; wherein the tray is driven by the motor; the outer frame has a plurality of through holes; the main frame is mounted between the cover plate and the outer frame; and the cover plate is connected to the main frame by holders. The feeds may hit the plurality of baffles on the tray to spray around the feeds when the tray is rotated by the motor; therefore, the distance that the feeds are sprayed is increased.

In a preferred embodiment, the power source further comprises a plurality of batteries and a battery cover, and the batteries are mounted between the battery cover and the main frame. The power controlling device is electrically connected to the power source so that the power controlling device may be controlled by the user to feed regularly to animal at the set time.

In a preferred embodiment, a bottom of the main frame has a via hole corresponding to the feeding opening of the cover plate, so that the feeding opening will allow feed from the feeding barrel to gravity flow out of the main frame and directly into the tray. The feeding opening will be sized so that enough feed is allowed to gravity flow into the tray to nourish animal.

In a preferred embodiment, the controller further comprises a printed circuit, a display, a keying and a control panel, and the controller is mounted in the main frame and is mounted adjacent to the power source. The user may control the time of spraying feeds to animal by means of pressing the keying on the control panel and the time and settings are displayed on the display.

In a preferred embodiment, the main frame has at least one fastening groove and the outer frame has at least one fastening block, so that the fastening block is fastened to the fastening groove to connect the main frame and the outer frame.

With the aforementioned structure, the present invention has following features. In the present invention, the motor is inversely mounted, and the tray is mounted below the motor, so that the inverse animal feeder is conveniently mounted on a barrel. Based on such design, it can be prevented the feeder from vibrating to enhance the stability of the feeder. Additionally, the structure of the inverse animal feeder simplifies to achieve low manufacturing cost.

BRIEF DESCRIPTION OF THE DRAWINGS

The present invention will become more understood from the detailed description given herein below and the accompanying drawings which are given by way of illustration only and thus are not limitative of the present invention and wherein:

FIG. 5 is a schematic perspective view of the inverse animal feeder mounted on a barrel.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
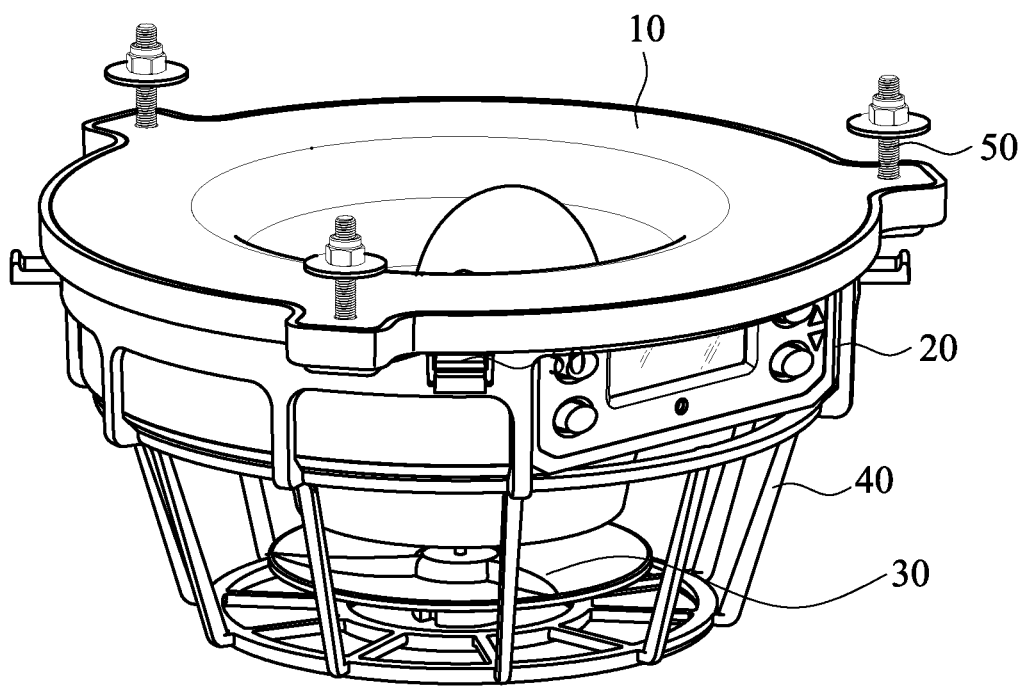
FIG. 1 is a schematic perspective view of an inverse animal feeder according to an embodiment of the present invention.
Figure 2:
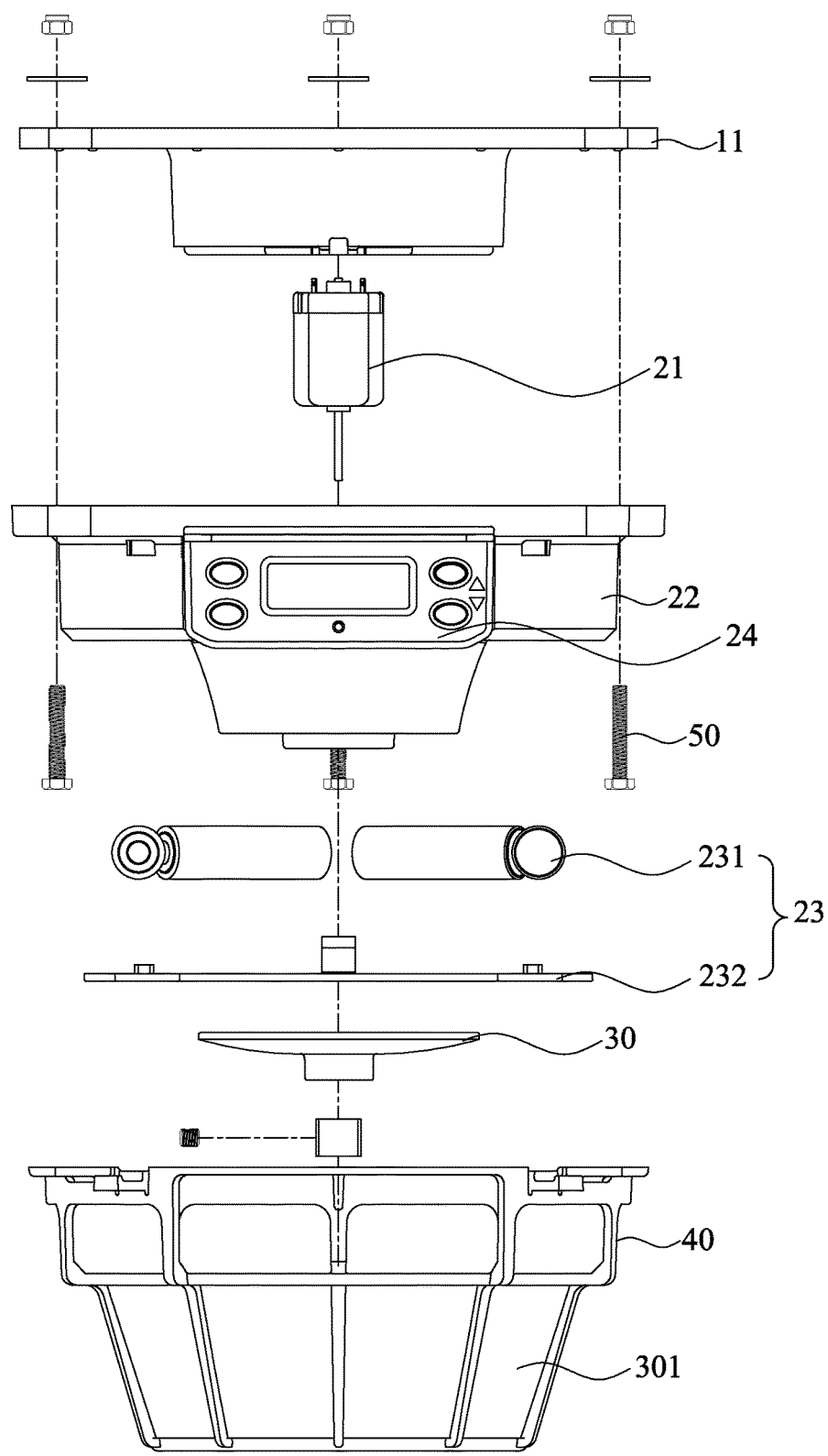
FIG. 2 is an exploded view of an inverse animal feeder according to the embodiment of the present invention.
Figure 3:
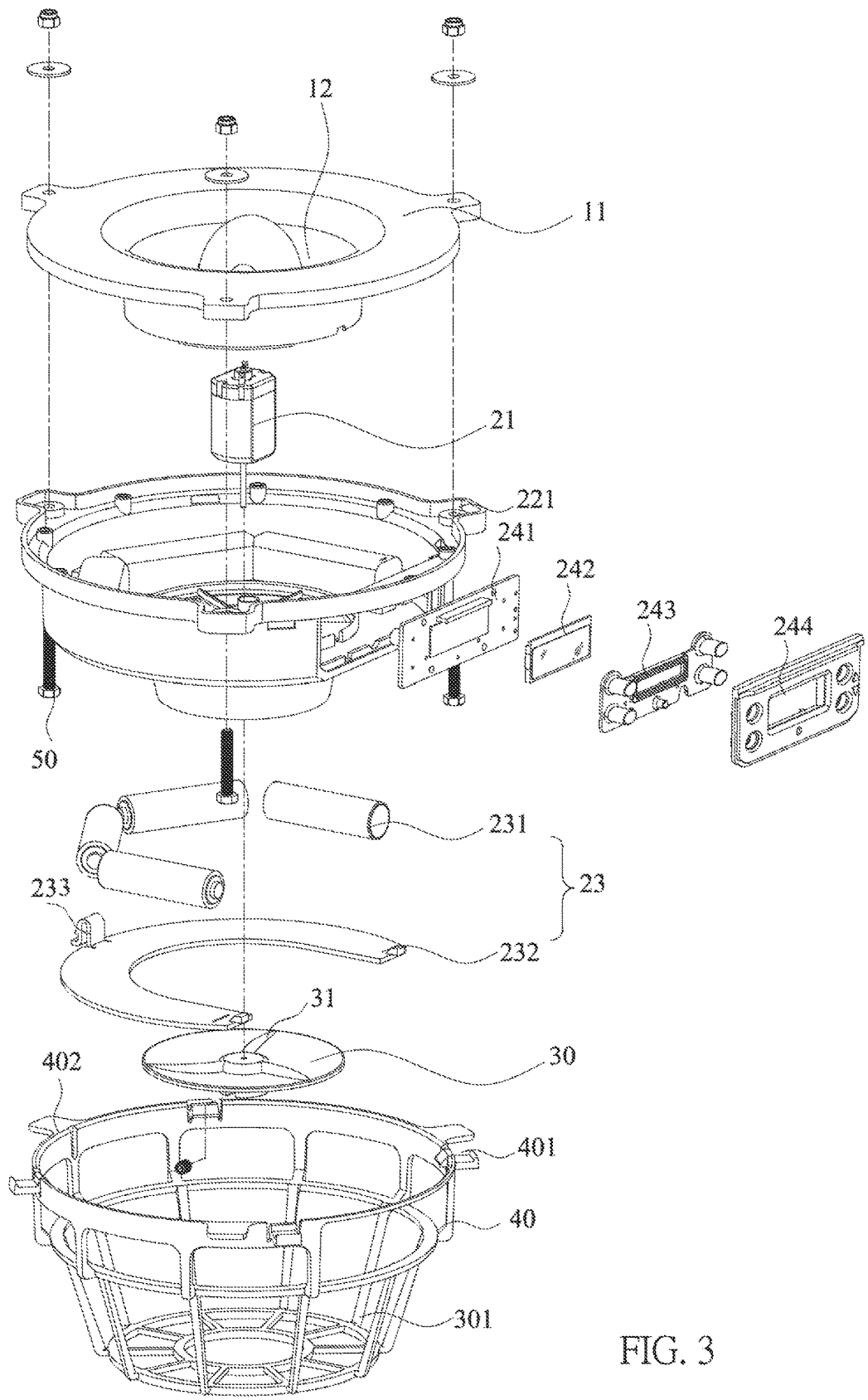
FIG. 3 is another exploded view of an inverse animal feeder according to the embodiment of the present invention.

Please refer to FIG. 1, FIG. 2 and FIG. 3, FIG. 1 is a schematic perspective view of an inverse animal feeder according to an embodiment of the present invention. FIG. 2 is an exploded view of an inverse animal feeder according to the embodiment of the present invention. FIG. 3 is another exploded view of an inverse animal feeder according to the embodiment of the present invention.

The inverse animal feeder 1 comprises a feeding device 10, a power controlling device 20 and a tray 30; wherein the feeding device 10 is mounted over the power controlling device 20, and the power controlling device 20 is mounted over the tray 30. Further, the feeding device 10 includes a cover plate 11 and a feeding opening 12, and the feeding opening 12 is mounted through the cover plate 11.

Further, the power controlling device 20 comprises a motor 21, a power source 23 and a controller 24 for feeding automatically, and the motor 21 is mounted in a main frame 22. Additionally, the cover plate 11 is connected to the main frame 22 by holders 50. The power source 23 further comprises a plurality of batteries 231 and a battery cover 232, and the batteries 231 are mounted between the battery cover 232 and the main frame 22. Furthermore, the bottom of the main frame 22 has a plurality of accommodating spaces (not shown in figures) in which the plurality of batteries 231 are located. The battery cover 232 has a second fastening groove 233 and the outer frame 40 has a second fastening block 402, so that the second fastening block 402 is fastened to the second fastening groove 233 to connect the battery cover 232 and the outer frame 40. A bottom of the main frame 22 has a via hole (not shown in figures) corresponding to the feeding opening 12 of the cover plate 11.

The controller 24 further comprises a printed circuit 241, a display 242, a keying 243 and a control panel 244, and the controller 24 is mounted in the main frame 22 and is mounted adjacent to the power source 23. The printed circuit 241 is disposed on the circumferential wall of the main frame 22, and the display 242 and the keying 243 are disposed between the printed circuit 241 and the control panel 244.

Furthermore, the tray 30 is mounted below the power controlling device 20 and is mounted in an outer frame 40 which has a plurality of through holes 301. Additionally, the tray 30 is driven by the motor 21, and the main frame 22 is mounted between the cover plate 11 and the outer frame 40. The main frame 22 has at least one first fastening block 221 and the outer frame 40 has at least one first fastening groove 401, so that the first fastening block 221 is fastened to the first fastening groove 401 to connect the main frame 22 and the outer frame 40.

Figure 4:
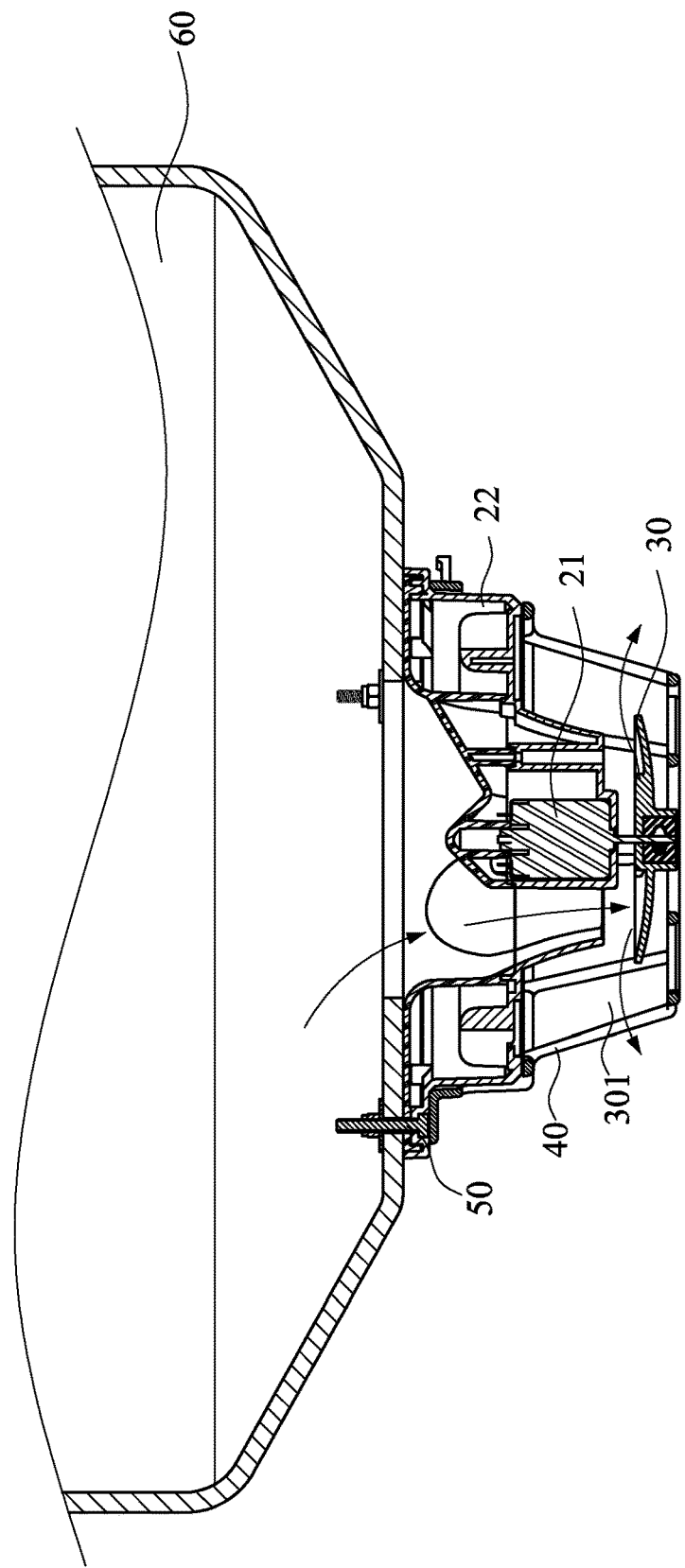
FIG. 4 is a perspective view of an action of the inverse animal feeder in FIG. 1.

Please refer to FIG. 4 and FIG. 5, FIG. 4 is a perspective view of an action of the inverse animal feeder in FIG. 1, and FIG. 5 is a schematic perspective view of the inverse animal feeder mounted on a barrel. The feeding opening 12 may allow the feeds from the feeding barrel 60 to gravity flow out of the main frame 22 and directly into the tray 30. Further, the tray 30 is driven by the motor 21 and then the tray is rotated. The feeds hit the plurality of baffles (not shown in figures) on the tray 30 and the feeds spray out from the plurality of through holes 301 so as to increase the distance that the feeds are sprayed. The user controls the time of spraying the feeds to animal by means of pressing the keying 243 on the control panel 244, and the time is displayed on the display 242. Therefore, the inverse animal feeder of the present invention is capable of feeding regularly to animal at the set time by a user.

The foregoing description, for the purpose of explanation, has been described with reference to specific embodiments; however. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the disclosure to the precise forms disclosed. Modifications and variations are possible in view of the above teachings.

I claim:

1. An inverse animal feeder, comprising:
a feeding device including a cover plate and a feeding opening through the cover plate;
a power controlling device comprising a motor in a main frame, a power source and a controller for feeding automatically; and
a tray with a plurality of baffles mounted below the power controlling device and in an outer frame;
wherein the tray is driven by the motor; the outer frame has a plurality of through holes; the main frame is mounted between the cover plate and the outer frame; and the cover plate is connected to the main frame by holders, and the power source further comprises a plurality of batteries and a battery cover, and the batteries are mounted between the battery cover and the main frame.

2. The inverse animal feeder of claim 1, wherein a bottom of the main frame has a via hole corresponding to the feeding opening of the cover plate.

3. The inverse animal feeder of claim 1, wherein the controller further comprises a printed circuit, a display, a keying and a control panel, and the controller is mounted in the main frame and is mounted adjacent to the power source.

* * * * *